US008351052B2

(12) United States Patent
Kritzer et al.

(10) Patent No.: US 8,351,052 B2
(45) Date of Patent: Jan. 8, 2013

(54) METHOD AND DEVICE FOR READING OUT A TOPOGRAPHIC STRUCTURE APPLIED TO A COMPONENT; AND A COMPONENT

(75) Inventors: Peter Kritzer, Forst (DE); Christian Bickel, Heppenheim (DE); Kurt Ewald, Frankenthal (DE); Christian Geubert, Zwingenberg (DE)

(73) Assignee: Carl Freudenberg KG, Weinhem (DE)

( * ) Notice: Subject to any disclaimer, the term of this patent is extended or adjusted under 35 U.S.C. 154(b) by 278 days.

(21) Appl. No.: 12/859,347

(22) Filed: Aug. 19, 2010

(65) Prior Publication Data
US 2011/0043824 A1   Feb. 24, 2011

(30) Foreign Application Priority Data

Aug. 19, 2009   (EP) ..................................... 09010651

(51) Int. Cl.
*G01B 11/24*   (2006.01)

(52) U.S. Cl. ...................................................... 356/601
(58) Field of Classification Search .................. None
See application file for complete search history.

(56) References Cited

U.S. PATENT DOCUMENTS

| 7,906,125 B2 * | 3/2011 | Bucay-Couto et al. ....... 424/400 |
| 8,041,005 B2 * | 10/2011 | Boyden et al. .................. 378/45 |
| 2006/0091214 A1 | 5/2006 | Hyde et al. |

FOREIGN PATENT DOCUMENTS

| GB | 2 237 412 A | * | 5/1991 |
| JP | 59017684 A | | 1/1984 |
| JP | 10282063 A | | 10/1998 |

* cited by examiner

*Primary Examiner* — Tu Nguyen
(74) *Attorney, Agent, or Firm* — Leydig, Voit & Mayer, Ltd.

(57) ABSTRACT

A method for reading a topographic structure applied to a component includes providing the component with the topographic structure, applying an agent configured to enhance a contrast of the structure to at least a region of the component where the structure is located and reading the topographic structure after the applying the agent.

16 Claims, 2 Drawing Sheets

METHOD AND DEVICE FOR READING OUT A TOPOGRAPHIC STRUCTURE APPLIED TO A COMPONENT; AND A COMPONENT

CROSS REFERENCE TO PRIOR APPLICATIONS

Priority is claimed to European Application No. EP 09010651.9, filed Aug. 19, 2009, the entire disclosure of which is incorporated by reference herein.

FIELD

The present invention relates to a method for reading out a topographic structure applied to a component, including an optical readout device and a device for implementing the method, as well as to the component that has been modified to this effect.

BACKGROUND

A device for reading out a graphical code is known from the U.S. Patent Application 2006/0091214 A1. The device includes a light source and sensors for recording the reflected light. To read out a code, the light source is directed at a component on whose surface the code has been placed. The light is reflected off of the surface, and the reflected light is recorded by the sensors. Depending on the physical form of the code, the light is either variably scattered or it is reflected in some regions of the code and absorbed in other regions. In both cases, the sensor detects a different incident light from the code sections, making it possible for the code to be detected and calculated. Besides two-dimensional codes, such as adhesively applied bar codes, for example, it is also conceivable for the code to be applied three-dimensionally to the component. In this context, the code extends in portions thereof and to varying degrees into the depth, and a topographic structure is thereby obtained. It is known, for example, to use a laser to burn fine structures into the surface of the component. A topographic structure produced in this manner typically has a depth of from 10 to 50 μm. Precision structures are always necessary when there is a need for placing a large amount of information on a particular surface or, however, when such information is to be provided redundantly, for example, to protect against destruction of the information. Enhanced tamper-proof properties are particularly advantageous for this type of identification marking. Codes of this kind are likewise read out through the use of a light source and sensors which sense the reflected light. This type of identification marking is also characterized by the fact that there is no need whatsoever for any additives, such as dyes, pigments or similar marking means. The code has the same surface properties as the rest of the component. However, particularly when working with smooth and curved surfaces, the problem arises that the structure sensed by the sensors can be low-contrast. This problem arises, in particular, when working with structures that are placed on curved surfaces. In the case of particularly smooth and, therefore, reflecting surfaces, light reflections can impede the reading out of the low-contrast structure. Other problems result in the formation of shadows when working with curved surfaces. It can happen in this case that a portion of the structure is in the shadowed region, whereas another portion resides in the illuminated region. Even in the case of surfaces that generally already have a substantial surface roughness and, therefore, do not reflect specularly, the process of reading out the structure can be made difficult. This is always the case when the depth of the structure is not much greater than the roughness. Such a state likewise results in a low-contrast structure.

SUMMARY OF THE INVENTION

An aspect of the present invention is to improve the method for reading out the topographic structure in a way that enhances the read-out accuracy.

In an embodiment, at least the region of the component where the structure is located is provided prior to the read-out process with an agent which enhances the contrast of the structure. In principle, an agent is selected which is applied reversibly to the component and may be removed following the read-out process. In this context, the removal process should be as simple as possible, thus be carried out by an air blast or suction process or by the use of an unproblematic solvent such as water. The structure and the surface properties of the component remain thereby unchanged. This procedure is particularly advantageous when merely one process control is to be carried out. However, it is also conceivable for the agent to be irreversibly applied, so that it remains in the structure. This is particularly advantageous when the component is to be read out again following production, for example, immediately prior to assembly. Moreover, under certain circumstances, such components may be also be read out following normal use of the component, thus following disassembly. Moreover, the agent may also be used for protecting the structure itself and for simplifying other process steps such as a surface treatment. The agent changes the reflectance properties of the surface, so that the contrast of the read out structure and thus the read-out accuracy are improved. The reflectance properties are preferably modified by providing diffuse reflectance properties of the surface. As a result, the surface appears dull and no longer glossy. In this context, the detected structure does not have any excessively bright sections which would make it more difficult to discern and read out the structure.

The agent may be a solid in pulverulent form. Powders are able to be simply applied and readily removed. The powders are developed in a way that precludes vigorous adherence thereof to the component. The agent may be an organic powder. Powders of this kind include flour or thermoplastic powder, for example. For the most part, these powders do not pose a health risk. Moreover, the previously mentioned powders are light in color and are, therefore, particularly suited for dark surfaces. The agent may also be an inorganic powder. Such powders include quartz powder, talc, zinc, titanium oxide or aluminum oxide. They are likewise mostly light in color and are particularly suited for dark surfaces. An agent that is dark in color and is, therefore, suited for light-colored surfaces is carbon black. The inorganic powders, including carbon black, are materials that are frequently used in the processing of elastic components, in particular. It is advantageous to use such powder materials that are already present in the rubber stock, particularly when the components are used for applications in the food-processing industry, because the components are typically not subject to any extended acceptance testing. Elastic components include, for example, seals, O-rings, tires, conveyor belts, hoses, bellows, membranes, and vibration-reducing components. These components are mostly made of an elastomer material, such as rubber, and mostly have a dark, low-sheen or dull surface. Moreover, the surfaces of these components are frequently curved. The agent produces a dull and high-contrast surface in the area of the topographic structure, thereby enhancing the accuracy achieved by the sensors when reading out the structure. Both the organic, as well as the inorganic powders are able to be readily removed from the surface.

Following the read-out process, the agent may be removed from the component with the aid of compressed air or a suction device. This allows the agent to be removed from the component without any contact being made with the component, and the component may be delivered, unaffected, to its normal use.

The agent may be a liquid. Liquids are likewise able to be readily applied, however, depending on the design of the component, they are more difficult to remove therefrom. Moreover, in contrast to the powder, it may be necessary to observe a drying period which prolongs the read-out time. However, when the agent is in the form of a liquid, exceedingly small particles, which have a very beneficial effect on the reflectance properties of the structure, may be advantageously applied to the component. For that purpose, the agent may be in the form of a suspension, dispersion or solution. In this type of form, particles remain in the structure following the drying process.

The powders or the particles may be permanently fixed in the structure. To this end, the powders may be dispersed in a liquid, together with an adhesive agent or binding agent, and introduced into the structure. Following the drying process, the powders or particles are then fixed in the structure. Powders or particles fixed in this manner advantageously make the structure more resilient against destruction during use of the components themselves. Moreover, sealing the structures prevents harmful substances, such as pathogens, from accumulating in the structure. Moreover, structures formed in this manner may also be used for components in clean room applications, where the release of particulate contaminants must be avoided at all costs. Another advantage is derived when the components are to undergo another surface-treatment processing step, for example, a coating process. For this, a smooth surface that is not influenced by the three-dimensional structure is then obtained following the sealing process. The roughness of the area of the structure that is provided with the agent is preferably comparable to that of the remaining surface of the component. Moreover, it is conceivable that the topographic structure is a two-dimensional code.

The particles may be formed as fluorescent, phosphorescent or UV-active particles. Particles developed in this manner are then able to be read out more readily.

The device according to the present invention for reading out a topographic structure applied to a component in accordance with the previously described method includes an optical readout device and a device for applying the agent. Preferably, the process of applying the agent, as well as the readout process are automated, so that, besides a short read-out time and a high throughput of components to be read out, a uniform quality of the application quantity of the agent and thus a uniform surface quality is achieved. In addition, another device for removing the agent may be provided. In this context, the process of removing the agent is preferably automated for the same reasons. To this end, another device may be a suction or blower device. In one advantageous embodiment, the device, which is composed of a readout device including a light source and sensors, the application device, and the additional removal device, is designed as an integrated unit.

BRIEF DESCRIPTION OF THE DRAWING

A few exemplary embodiments of the method according to the present invention are clarified in the following with reference to the figures. They show schematically.

DETAILED DESCRIPTION

Figure 1:
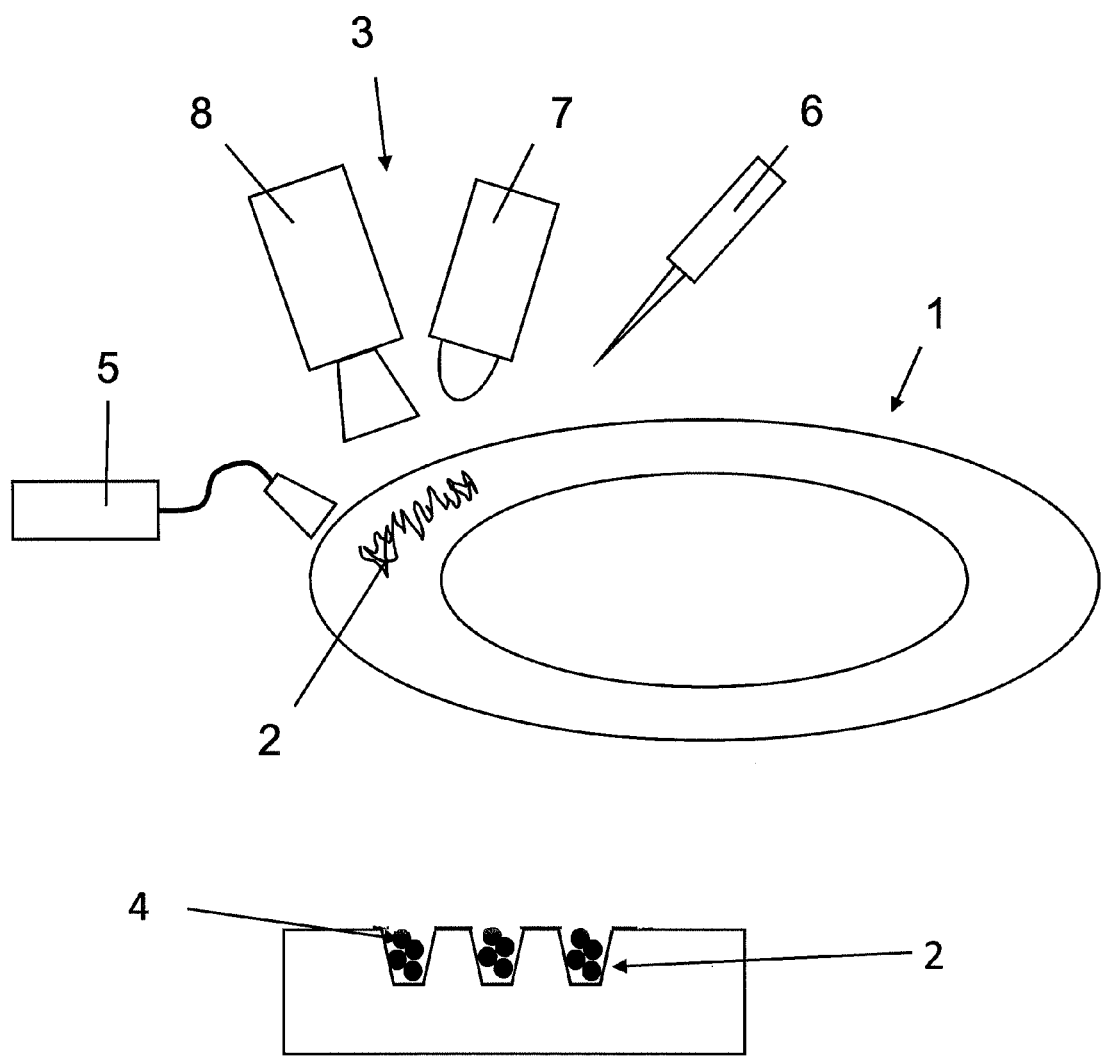
FIG. 1: the method and the device including a pulverulent agent.

FIG. 1 shows a device for reading out a topographic structure 2 applied to a component 1, the device having an optical readout device 3. In this context, component 1 is made of an elastomer material, and topographic structure 2 is a three-dimensional structure that was introduced by a laser into component 1. Optical readout device 3 encompasses a light source 7, for example, an LED, and a sensor unit 8 which detects the light of the light source reflected from component 1 and thereby reads out the structure. The region of component 1 where structure 2 is located is provided prior to the read-out process with an agent 4 which enhances the contrast of structure 2. To this end, in addition to optical readout device 3, the device for the readout process includes a device 5 for applying agent 4. In this embodiment, the agent is an inorganic powder. Once structure 2 has been read out by readout device 3, the agent is removed from component 1. To this end, another device 6 for removing agent 4 is provided in the device. In this context, the other device 6 is a blower device which is used to remove agent 4 from the component using compressed air.

Figure 2:
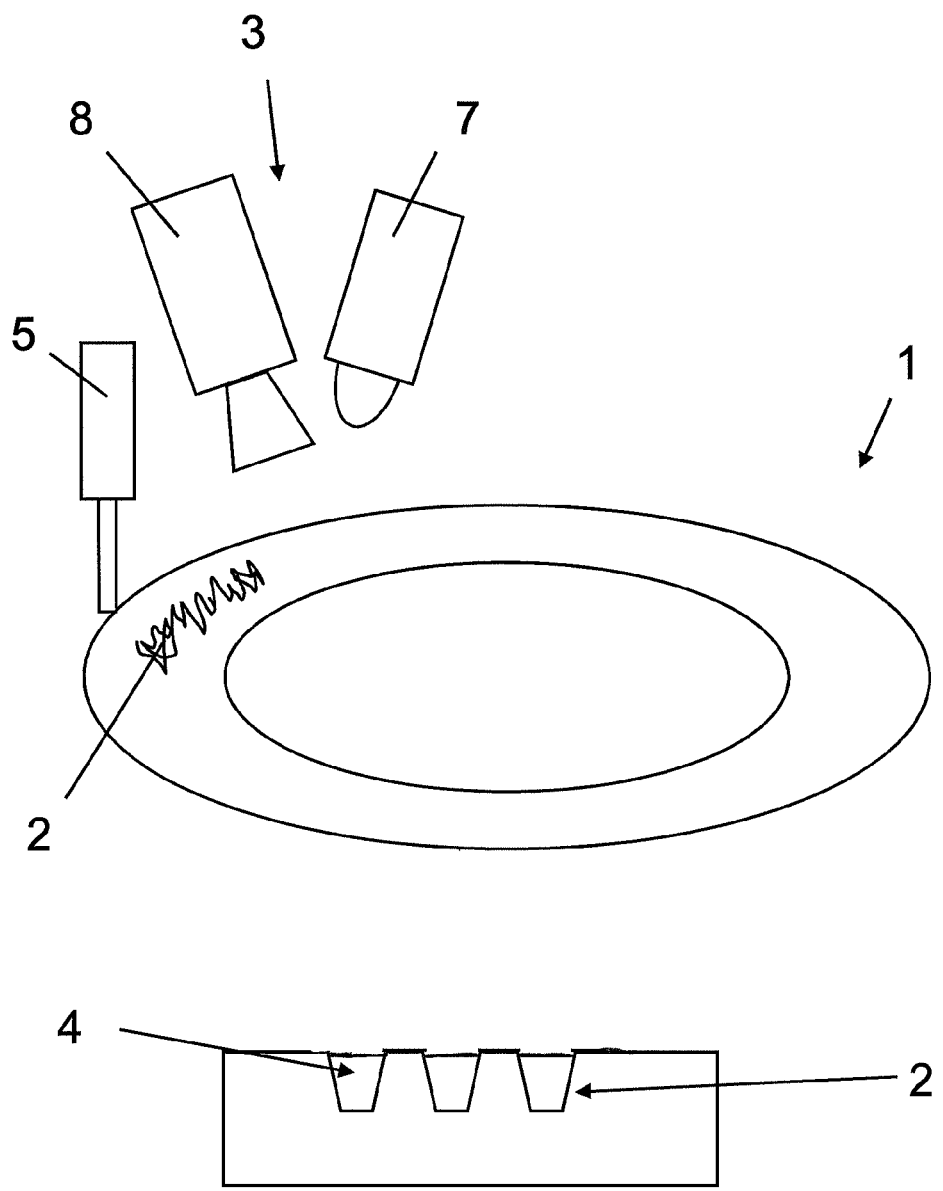
FIG. 2: the method and the device including a liquid agent.

FIG. 2 shows a device in accordance with FIG. 1; in this embodiment, device 5 being designed to apply agent 4 in such a way that a liquid solution is used as agent 4. Agent 4 is fixed in the structure by a binding agent, i.e., an adhesive agent, and remains there permanently. The binding agent is formed in such a way that agent 4 has properties that are comparable to the remaining surface of component 1.

What is claimed is:

1. A method for reading a code applied to a component comprising:
   providing the component with a three-dimensional topographic structure representing the code disposed within a surface of the component and having a depth that partially extends through the component;
   applying an agent configured to enhance a contrast of the topographic structure to at least a region of the component where the structure is located such that the agent is disposed in the depth of the topographic structure below and within the surface; and
   reading the topographic structure after the applying the agent so as to determine the code.

2. The method as recited in claim 1, wherein the agent is a solid in pulverulent form.

3. The method as recited in claim 1, wherein the agent includes an organic powder.

4. The method as recited in claim 1, wherein the agent includes an inorganic powder.

5. The method as recited in claim 1, further comprising removing the agent from the component using one of compressed air and a suction device after the reading.

6. The method as recited in claim 1, wherein the agent is a liquid.

7. The method as recited in claim 6, wherein the agent includes at least one of a suspension, a dispersion and a solution.

8. The method as recited in claim 1, wherein the applying includes permanently fixing the agent in the structure.

9. The method as recited in claim 1, further comprising introducing the topographic structure within the surface of the component using a laser.

10. The method as recited in claim 9, wherein the surface is a curved surface.

11. The method as recited in claim 9, wherein the introducing is performed such that the depth of the topographic structure is from 10 to 50 µm.

12. A component comprising:

a three-dimensional topographic structure representing a code disposed within a surface of the component and having a depth that partially extends through the component;

an agent disposed in the topographic structure below and within the surface so as to enhance a contrast of the code.

13. The component as recited in claim 12, wherein the component is made from an elastomer material.

14. The component as recited in claim 13, wherein the agent is a powder material used in the elastomer material.

15. The component as recited in claim 12, wherein the surface is a curved surface.

16. The component as recited in claim 12, wherein the depth of the topographic structure is from 10 to 50 µm.

* * * * *